United States Patent [19]

Mutalibov et al.

[11] 4,332,486
[45] Jun. 1, 1982

[54] ROTARY PULSATION APPARATUS

[76] Inventors: Abdusalam A. Mutalibov, ulitsa Shpilkova, 28; Oleg D. Murashov, ulitsa Navoi, 22, kv. 5; Takhir M. Makhmudov, ulitsa Ivlieva, 26; Leonid M. Shvartsman, TS-13, 20, kv. 18, all of Tashkent; Alexei D. Deminov, Starokonjushenny pereulok, 32, kv. 8, Moscow; Valentina A. Podlesnykh, ulitsa B. Galushkina, 17, kv. 426, Moscow; Lev A. Spirin, ulitsa Novinki, 6, korpus 1, kv. 10, Moscow, all of U.S.S.R.

[21] Appl. No.: 196,046
[22] PCT Filed: Sep. 19, 1979
[86] PCT No.: PCT/SU79/00082
 § 371 Date: May 27, 1980
 § 102(e) Date: May 23, 1980
[87] PCT Pub. No.: WO80/00798
 PCT Pub. Date: May 1, 1980

[30] Foreign Application Priority Data

Sep. 26, 1978 [SU] U.S.S.R. ............................. 2662187
Sep. 26, 1978 [SU] U.S.S.R. ............................. 2662188

[51] Int. Cl.³ ............................................ B01F 15/06
[52] U.S. Cl. .................................. 366/146; 366/168; 366/171; 366/304
[58] Field of Search ................ 366/303, 304, 144, 145, 366/146, 147, 176, 168, 178, 23, 167, 171

[56] References Cited

U.S. PATENT DOCUMENTS

| 2,478,893 | 8/1949 | Brant | 366/146 |
| 2,868,516 | 1/1959 | Moseley | 366/176 |
| 2,882,149 | 4/1959 | Willems | 366/304 |
| 2,939,770 | 6/1960 | Schwartzkopff | 366/168 |
| 3,929,320 | 12/1975 | Haller | 366/178 |

Primary Examiner—Robert W. Jenkins
Attorney, Agent, or Firm—Lilling & Greenspan

[57] ABSTRACT

A rotary pulsation apparatus comprises a casing, walls of which define a premixing chamber having an inlet to admit emulsions and/or suspensions into the apparatus. The casing has also a mixing chamber communicating with the chamber and accommodating a rotor and a stator intended to produce a variable resistance to the flow during rotation of the rotor. According to the invention, the premixing chamber accommodates a reservoir having a multiplicity of perforations and being in communication with a source of at least one additional ingredient of a mixture to be obtained.

6 Claims, 2 Drawing Figures

4,332,486

ROTARY PULSATION APPARATUS

FIELD OF THE INVENTION

The present invention relates to mixing devices and, more particularly, to a rotary pulsation apparatus.

BACKGROUND OF THE INVENTION

Widely known in the art is a rotary pulsation apparatus intended to obtain a fine-dispersed mixture of emulsions and/or suspensions.

It is known to those versed in the art that "dispersing" means breaking up particles of some substance into smaller particles of a required size. By a finedispersed liquid mixture is meant a very fine disintegration of particles of a liquid mixture which determines a homogeneous state of ingredients making up said mixture.

The known rotary pulsation apparatus comprises a casing whose walls at the top portion thereof define a premixing chamber.

The premixing chamber has three inlets disposed symmetrically with respect to the longitudinal axis of the casing.

The inlets are connected to a piping intended to supply a liquid mixture, which is emulsion and/or suspension, to the rotary pulsation apparatus.

The premixing chamber is of substantially cylindrical shape.

The casing, in the middle portion thereof, is provided with a mixing chamber communicating with the premixing chamber through a passage defined by a side wall of the casing.

The mixing chamber accommodates a rotor and a stator designed to offer variable resistance to a flow of emulsions and/or suspensions in the process of rotation of the rotor.

The inner side of a mixing chamber bottom, being in fact the stator, is provided with projections disposed symmetrically relative to the longitudinal axis of the casing, made in the form of teeth arranged along the radii extending from the longitudinal axis of the casing and equally spaced over concentric circles.

The rotor is essentially a disc fixedly secured to a shaft mounted along the longitudinal axis of the casing and rotated by an electric motor installed on an upper cover of the casing.

In the premixing chamber, fixedly secured to the shaft are blades intended to swirl and to force the liquid mixture into the mixing chamber.

The disc, on its side facing the projections of the mixing chamber bottom, has projections which are also disposed over concentric circles symmetrically with respect to the longitudinal axis of the casing. Their shape and arrangement are analogous to those of the projections of the mixing chamber bottom described above, but the radii of the concentric circles differ from those of the concentric circles over which the projections of the mixing chamber bottom are disposed.

Between the projections of the disc and walls of the slots made up by the adjacent projections of the mixing chamber bottom as well as between the projections of the mixing chamber bottom and walls of the slots made up by the projections of the disc formed are passages to pass the liquid mixture from the mixing chamber to an outlet at resistance varying in the process of rotation of the rotor.

The outlet is provided in the bottom of the mixing chamber around the shaft along the longitudinal axis of the casing.

In the mixing chamber, above the disc, fixedly secured to the drive shaft are blades intended to make the mixture flow.

The known rotary pulsation apparatus fails to be sufficiently effective in the case when especially thorough dispersing of at least one of the mixture ingredients is required. Moreover, the mixture prepared with the use of the known apparatus features insufficiently high stability.

DISCLOSURE OF THE INVENTION

It is, therefore, an object of the present invention to provide a rotary pulsation apparatus having a premixing chamber made so as to obtain a liquid mixture which would feature substantially high degree of dispersion and sufficiently high stability.

This object is attained a rotary pulsation apparatus, walls of whose casing define a premixing chamber having an inlet to admit emulsions and/or suspensions into the apparatus and also a mixing chamber communicating with the premixing chamber, having an outlet and accommodating a rotor and a stator intended to provide a variable resistance to a flow of emulsions and/or suspensions in the process of rotation of the rotor. According to the invention, the premixing chamber accommodates a reservoir having walls provided with a multiplicity of perforations and communicating with a source of at least one additional ingredient of a mixture to be obtained.

It is expedient that the additional ingredient be a liquid ingredient supplied from the source under pressure, the perforations in the walls be made in the form of pores and the reservoir be provided with a means for raising the temperature of the liquid ingredient to a temperature of gas formation to convert it into a condensate when the gas goes out through the pores of the reservoir wall.

Such a construction enables one of the ingredients of the liquid mixture to be changed into a fine-dispersed condensate when the gas goes out through the pores of the reservoir wall.

Individual particles of the condensate then fulfil a function of nuclei round which particles of other ingredients present in the premixing chamber collect thereby facilitating obtaining a dispersed liquid mixture of high stability.

Preferably, the temperature raising means is made in the form of electric heating elements disposed in the reservoir.

The temperature raising means of such a design are substantially simple and reliable in operation.

Preferably, the reservoir walls are made of a cerment material.

The porous wall made of such material is durable and reliable.

The reservoir walls may be made of elastic material and the additional ingredient may comprise solid particles to be dissolved by emulsions and/or suspensions flowing through the reservoir perforations.

Owing to this, the flow of emulsions and/or suspensions, when passing through the perforated walls of the elastic reservoir, causes elastic vibration of the perforated walls to occur which precludes sticking of individual solid particles in the wall perforations and facilitates a more complete dissolving of solid particles of the additional ingredient.

This provides a substantially high degree of dispersing of solid particles in the flow of emulsions and/or suspensions and obtaining of a homogeneous and stable liquid mixture.

The reservoir may also be made in the form of a tore disposed symmetrically relative to the longitudinal axis of the premixing chamber.

Such a construction enables the flow of emulsions and/or suspensions to uniformly pass through the reservoir perforated walls and around the reservoir.

The rotary pulsation apparatus of the present invention, being of a simple and reliable construction, ensures obtaining a fine-dispersed liquid mixture of high stability.

The invention will now be described in greater detail with reference to specific embodiments thereof taken in conjunction with the accompanying drawings.

BEST MODE FOR CARRYING OUT THE INVENTION

Figure 1:
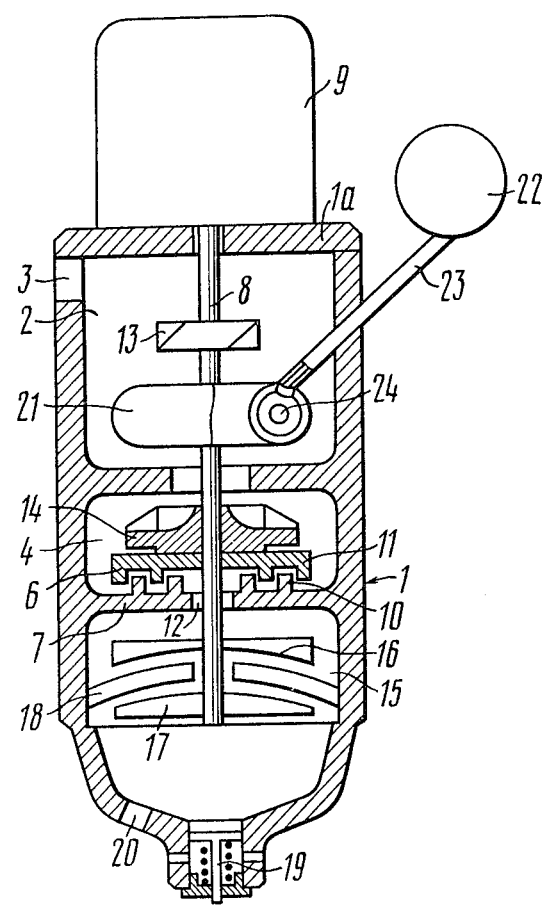
FIG. 1 is a longitudinal sectional view of a rotary pulsation apparatus of the invention, in which a liquid ingredient is supplied under pressure from a source, perforations in walls are made in the form of pores and a reservoir is provided with electric heating elements.

A rotary pulsation apparatus illustrated in FIG. 1 comprises a casing 1 of substantially cylindrical shape. A longitudinal axis 0—0 of the casing 1 is disposed vertically.

Disposed in the upper part of the casing 1 is a premixing chamber 2 defined by walls of the casing 1 and featuring substantially cylindrical shape. The premixing chamber 2 in the upper part of its side walls has an inlet 3 to admit a liquid mixture, which is an emulsion and/or suspension, into the apparatus.

In the middle part of the casing 1 there is a mixing chamber 4 defined by the walls thereof and communicating with the chamber 2 through a passage 5 extending along the longitudinal axis 0—0 of the casing 1 and defined by the casing walls.

The mixing chamber 4 is arranged coaxially with the premixing chamber 2 so that its longitudinal axis coincides with the longitudinal axis 0—0 of the casing 1. The mixing chamber 4 is of an substantially cylindrical shape and accommodates a rotor 6 and a stator 7 intended to produce a variable resistance to a flow of the liquid mixture during rotation of the rotor 6.

The rotor 6 comprises a disc, designated by the same reference numeral 6, rigidly secured to a shaft 8 and disposed in the mixing chamber 4.

The shaft 8 is arranged in the casing 1 along the longitudinal axis 0—0 and extends through the premixing chamber 2 and the mixing chamber 4.

The shaft 8 is rotated by an electric motor 9 mounted on an upper cover 1a of the casing 1.

Used as the stator 7 is a bottom of the mixing chamber 4 designated by the same reference numeral 7. A surface of the bottom 7 facing the chamber 4 has projections 10 in the form of trapezoidal teeth.

The projections 10 are disposed symmetrically relative to the longitudinal axis 0—0 of the casing 1 and uniformly over concentric circles, and equally spaced from one another radially.

The upper surface of the disc 6 is flat, whereas its lower surface facing the projections 10 of the bottom 7 of the mixing chamber 4 has projections 11.

The projections 11 have the shape and sizes analogous to those of the projections 10 and are disposed analogously on the disc 6. But the concentric circles over which the projections 11 of the disc 6 are arranged have radii differing from those of the concentric circles over which the projections 10 of the bottom 7 of the chamber 4 are arranged.

The projections 11 of the disc 6, when rotating, pass near the projections 10 of the bottom 7. Due to this, a variable resistance is produced to the flow of emulsion and/or suspension which results in an increased flow turbulence and in increased pulsations contributing to better dispersing of emulsion and/or suspension.

An outlet 12 is provided in the bottom 7 along the longitudinal axis 0—0 of the casing 1.

In the premixing chamber 2 rigidly secured to the drive shaft 8 are blades 13 disposed symmetrically relative to the longitudinal axis 0—0 of the casing 1 and having a curved chord whose bulge faces the side opposite the sense of rotation.

The blades 13 are intended to move the liquid mixture flow from the inlet 3 through the premixing chamber 2 to the mixing chamber 4.

Rigidly secured to the shaft 8 in the mixing chamber 4 are blades 14 the purpose, shape and arrangement of which are analogous to those of the blades 13.

In the lower part of the casing 1, the walls thereof define an admixing chamber 15 disposed coaxially with the chambers 2 and 4. Two rows of elastic blades 16 and 17 are fixedly mounted on the shaft 8 in the chamber 15. Mounted on the side walls of the chamber 15 are also elastic blades 18. They are arranged between the rows of the blades 16 and 17.

The blades 16, 17 and 18 are designed to additionally disperse emulsions or suspensions.

The bottom of the chamber 15 supports a relief valve 19 to release excess pressure of air liberated during dispersing.

The valve 19 may be of any construction suitable for the purpose and is not described here in order to not obscure the essence of the invention. The bottom of the chamber 15 has a hole 20 to let the processed emulsion and/or suspension go out.

According to the present invention, the premixing chamber 2 accommodates a reservoir 21 having walls with a multiplicity of perforations and communicating with a source 22 which supplies at least one additional ingredient of the mixture to be obtained.

In the embodiment of the invention illustrated in FIG. 1, the additional ingredient is a liquid ingredient fed from the source 22 under pressure through a piping 23. The perforations in the walls are made in the form of pores and the reservoir 21 is provided with a means 24 for raising the temperature of the liquid ingredient up to a temperature of gas formation to convert it into a condensate when the gas escapes through the pores of the wall of the reservoir 21.

The temperature raising means 24 is made in the form of electric heating elements designated with the same reference numeral 24, disposed in the reservoir 21 and connected to a current source (not shown).

The walls of the reservoir 21 in this case are made of cermet.

Figure 2:
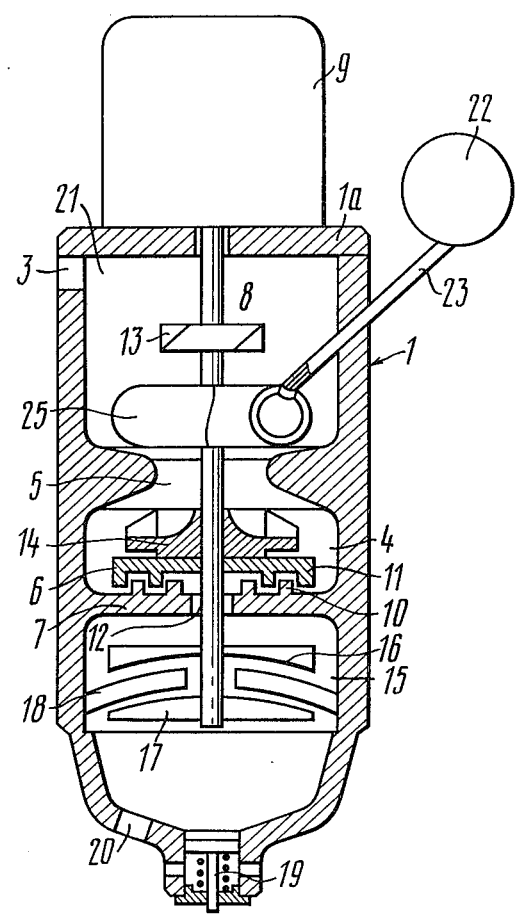
FIG. 2 is a longitudinal sectional view of an alternative embodiment of the invention, in which the reservoir walls are made of an elastic material and solid particles are dissolved by a flow of emulsions and/or suspensions passing through the reservoir.

In the alternative embodiment of the invention illustrated in FIG. 2, walls of a reservoir 25 are made of elastic material. The additional ingredient comprises solid particles to be dissolved by the liquid mixture flow passing through the reservoir 25. The perforation sizes depend on the sizes of the solid particles.

The reservoirs 21 and 25 are shaped as a tore disposed symmetrically with respect to the longitudinal axis 0—0 of the casing 1.

The rotary pulsation apparatus illustrated in FIG. 1 operates in the following way.

With the electric motor 9 switched on, the shaft 8 starts rotating. The liquid mixture, which is an emulsion and/or suspension, enters through the inlet 3 onto the premixing chamber 2 and under the action of pressure build up by the blades 13 in the premixing chamber 2 and by the blades 14 in the mixing chamber 4 flows through the passage 5 communicating the premixing chamber 2 and the mixing chamber 4 to the disc 6.

In the course of rotation of the rotor 6 in the liquid mixture flowing through the chambers 2 and 4, gas bubbles are formed and damaged under the action of arising waves. High-frequency microexplosions and energy thus liberated cause considerable disintegration and breaking of the liquid particles, i.e., dispersing of the liquid mixture particles.

The additional liquid ingredient fed from the source 22 under pressure through the piping 23 into the reservoir 21 is heated by the electric heating elements 24 to be changed into gas which in the form of microdrops passes through the porous walls of the reservoir 21 to be condensed on the outer surface of the walls.

The condensed microdrops of the additional liquid ingredient are warpped in drops of the liquid mixture flowing round the reservoir 21 and form a fine-dispersed liquid mixture of high stability.

With the disc 6 rotating the liquid mixture passes periodically through the space either between the projections 11 of the rotating disc 6 and the slots defined by the sides of the projections 10 of the bottom 7 of mixing chamber 4, or between the projections 10 of the bottom 7 of the mixing chamber 4 and the slots defined by the sides of the projections 11 of the disc 6. During rotation of the rotor the liquid mixture flow is periodically discontinued which causes turbulent pulsation of the liquid and wave field to occur and as a result obtaining of the mixture featuring a higher degree of dispersion.

fter passing the mixing chamber 4 the liquid mixture enters the admixing chamber 15.

In the admixing chamber 15 the liquid mixture is subjected to an additional influence of vibration, both of low-frequency vibration caused by the rotating blades 16 and 17 and of high-frequency vibration which occurs in the admixing chamber 15 due to the action of the rotating shaft 8 on the liquid mixture flow.

The fine-dispersed mixture thus prepared is discharged through the outlet hole 20 into a special tank (not shown).

The rotary pulsation apparatus made in accordance with an alternative embodiment of the invention and illustrated in FIG. 2 operates as described for the apparatus of FIG. 1 but with some differences consisting in that solid particles of the additional ingredient are supplied from the source 22 through the piping 23 into the reservoir 25. When the liquid mixture flows through the perforations in the walls of the reservoir 25, the solid particles are dissolved. The vibration occurring in the elastic walls of the reservoir 25 facilitates more complete dissolving of the solid particles and precludes sticking of individual particles in the perforations of the walls of the reservoir 25.

The rotary pulsation apparatus makes it possible to obtain a liquid mixture of hard-to-mix ingredients, such as gasoline and water, diesel fuel and water, with substantially high degree of dispersion, to be supplied to, e.g., internal combustion engines, and with durability from 7 to 20 hours. This results in a sharp reduction of toxicity of exhaust gases, in a considerably enhanced economy (up to 10 percent) and somewhat increased power of the engines.

INDUSTRIAL APPLICABILITY

The rotary pulsation apparatus of the invention can be used most efficiently in thermal power plants to obtain fine-dispersed and very stable liquid fuel.

The present invention can be also used to advantage in construction industry to manufacture construction materials, in chemical industry to produce, for example, various glues and impregnants for fabrics, as well as in food, pharmaceutical and furniture industries to make decorative coats.

We claim:

1. A rotary pulsation apparatus having a casing with walls defining a premixing chamber having an inlet to admit emulsions and/or suspensions into the apparatus, and a mixing chamber communicating with the premixing chamber, having an outlet and accommodating a rotor and a stator to provide a variable resistance to a flow of emulsions and/or suspensions with the rotor rotating, wherein an improvement comprises a reservoir accommodated in the premixing chamber, having walls provided with a multiplicity of perforations and communicating with a source of at least one additional ingredient of a mixture to be obtained.

2. A rotary pulsation apparatus according to claim 1, wherein the additional ingredient includes a liquid ingredient supplied from the source under pressure, the perforations in the walls are made in the form of pores and the reservoir is provided with a means for raising the temperature of the liquid ingredient to a temperature of gas formation to convert the liquid ingredient into a condensate when the gas goes out through the pores of the wall of the reservoir.

3. A rotary pulsation apparatus according to claim 2, wherein the temperature raising means includes electric heating elements disposed in the reservoir.

4. A rotary pulsation apparatus according to claim 2, wherein the walls of the reservoir are made of cermet.

5. A rotary pulsation apparatus according to claim 1, wherein the walls of the reservoir are made of an elastic material, and the additional ingredient comprises solid particles to be dissolved by the flow of emulsions and/or suspensions passing through the perforations of the reservoir.

6. A rotary pulsation apparatus according to claim 1, wherein the reservoir is made in the form of a tore disposed symmetrically relative to a longitudinal axis of the premixing chamber.

* * * * *